(12) United States Patent
Tobias et al.

(10) Patent No.: US 11,458,781 B1
(45) Date of Patent: Oct. 4, 2022

(54) SYSTEM FOR VEHICLE MONITORING UTILIZING TIRE PRESSURE SENSORS

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

( * ) Notice: Subject to any disclaimer, the term of this patent is extended or adjusted under 35 U.S.C. 154(b) by 0 days.

(21) Appl. No.: 17/495,049

(22) Filed: Oct. 6, 2021

Related U.S. Application Data

(60) Provisional application No. 63/111,140, filed on Nov. 9, 2020.

(51) Int. Cl.
*B60C 23/04* (2006.01)
*G08G 1/017* (2006.01)
*G08G 1/14* (2006.01)

(52) U.S. Cl.
CPC ...... *B60C 23/0479* (2013.01); *B60C 23/0442* (2013.01); *B60C 23/0461* (2013.01); *G08G 1/017* (2013.01); *G08G 1/149* (2013.01)

(58) Field of Classification Search
CPC .............. B60C 23/0408; B60C 23/009; B60C 23/0416; B60C 23/044; B60C 23/0462; B60C 23/045
See application file for complete search history.

(56) References Cited

U.S. PATENT DOCUMENTS

| | | | |
|---|---|---|---|
| 4,730,188 A | 3/1988 | Milheiser | |
| 6,915,229 B2 | 7/2005 | Taguchi | |
| 7,015,801 B1* | 3/2006 | Juzswik | B60C 23/0408 340/447 |
| 7,952,472 B2 | 5/2011 | Okada | |
| 8,102,241 B2 | 1/2012 | Okada | |
| 9,168,796 B2 | 10/2015 | Abichaaya | |
| 10,220,660 B2 | 3/2019 | Mcintyre | |
| 10,232,673 B1 | 3/2019 | Lavoie | |
| 2008/0252435 A1* | 10/2008 | Chien | B60C 23/0408 340/447 |
| 2008/0276670 A1* | 11/2008 | Marini | E05B 85/243 70/240 |
| 2013/0029623 A1 | 1/2013 | Murakami | |
| 2019/0108700 A1* | 4/2019 | Chelnik | G07C 9/28 |
| 2019/0184772 A1* | 6/2019 | Bill | B60C 23/20 |

FOREIGN PATENT DOCUMENTS

| | | |
|---|---|---|
| CN | 201670174 | 12/2010 |
| JP | 2003211924 | 7/2003 |
| KR | 20140136322 | 11/2014 |

* cited by examiner

*Primary Examiner* — Mirza F Alam
(74) *Attorney, Agent, or Firm* — Jeffrey A. Proehl; Woods, Fuller, Shultz & Smith, PC

(57) ABSTRACT

A system for monitoring of a vehicle with an inflation signaling apparatus having at least one inflation reporting assembly. The inflation reporting assembly may be configured to wirelessly transmit an information signal including an identification (ID) code. The system may also include at least one vehicle monitoring apparatus configured to monitor a characteristic of the vehicle based upon the inflation signaling apparatus associated with the vehicle. The vehicle monitoring apparatus may be configured to sense a presence of the inflation reporting assembly proximate to the vehicle monitoring apparatus via reception by the monitoring apparatus of a transmission of the ID code by the inflation signaling apparatus associated with the vehicle.

20 Claims, 5 Drawing Sheets

SYSTEM FOR VEHICLE MONITORING UTILIZING TIRE PRESSURE SENSORS

REFERENCE TO RELATED APPLICATIONS

This application claims the benefit of U.S. Provisional Application No. 63/111,140, filed on Nov. 9, 2020, the entirety of which is hereby incorporated by reference in its entirety.

BACKGROUND

Field

The present disclosure relates to presence sensing systems and more particularly pertains to a new system for vehicle monitoring utilizing tire pressure sensors for detecting and monitoring status aspects of a vehicle, such as presence proximate to a point or location.

SUMMARY

In one aspect, the present disclosure relates to a system comprising a vehicle with an inflation signaling apparatus having at least one inflation reporting assembly, and the inflation reporting assembly may be configured to wirelessly transmit an information signal including an identification (ID) code. The system may also include at least one vehicle monitoring apparatus configured to monitor a characteristic of the vehicle based upon the inflation signaling apparatus associated with the vehicle. The vehicle monitoring apparatus may be configured to sense a presence of the inflation reporting assembly proximate to the vehicle monitoring apparatus via reception by the monitoring apparatus of a transmission of the ID code by the inflation signaling apparatus associated with the vehicle.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
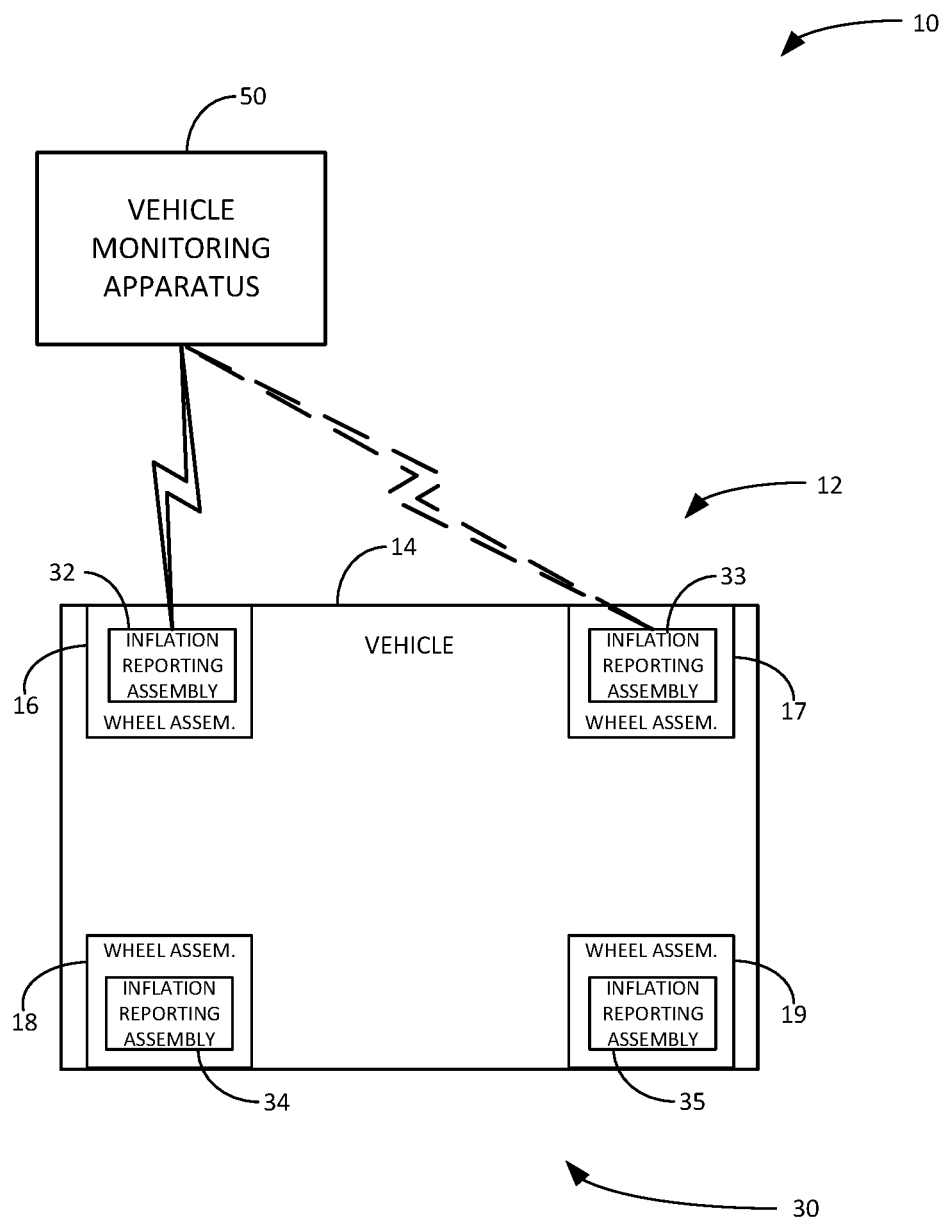
FIG. 1 is a schematic diagram of elements of a new system for vehicle monitoring utilizing tire pressure sensors according to the present disclosure, particularly showing a vehicle monitoring apparatus and a vehicle with inflation reporting assemblies.
Figure 2:
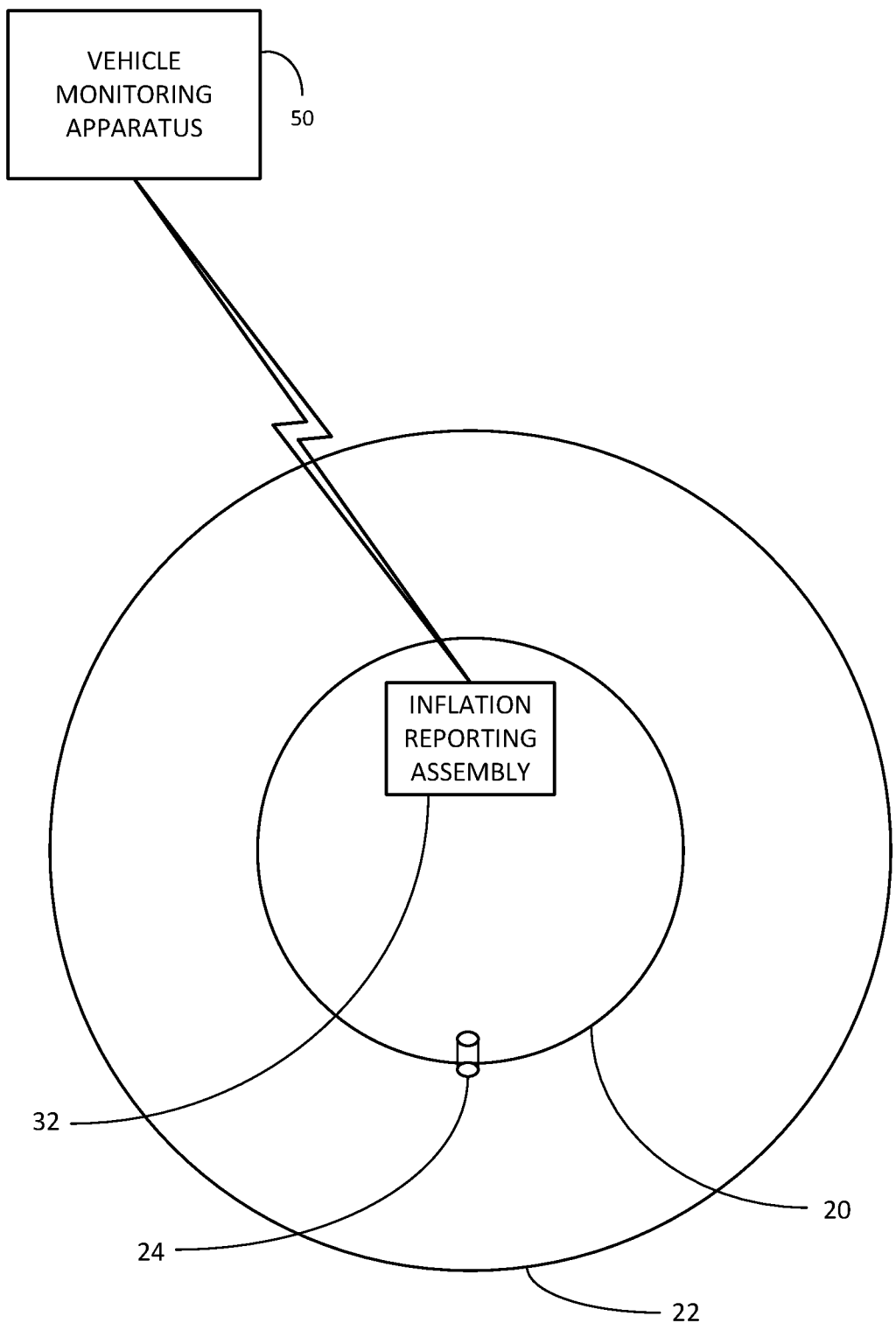
FIG. 2 is a schematic diagram of elements of the system for vehicle monitoring showing a vehicle monitoring apparatus and a wheel assembly of a vehicle, according to an illustrative embodiment.
Figure 3:
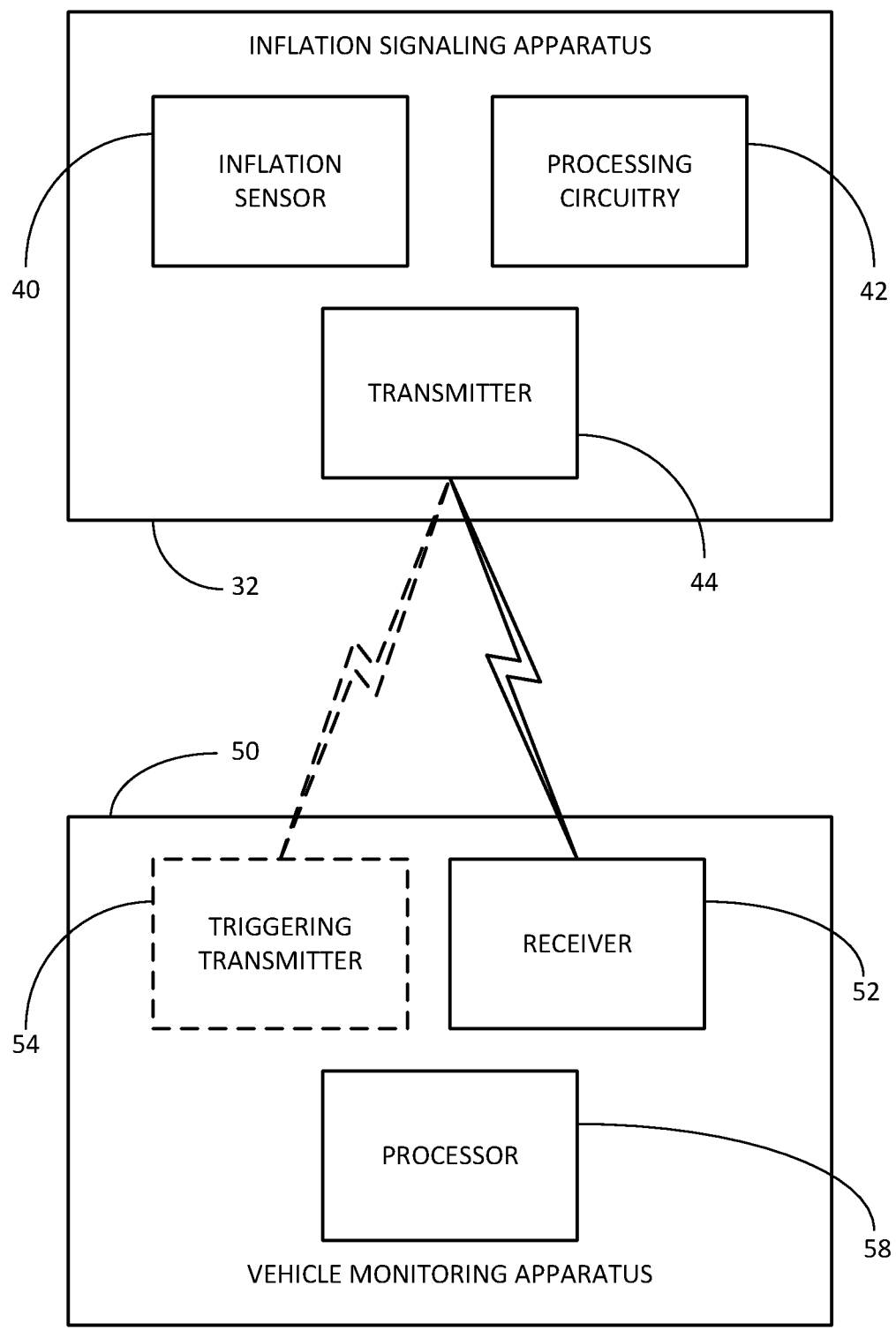
FIG. 3 is a schematic diagram of elements of the system for vehicle monitoring showing details of an inflation signaling apparatus and a vehicle monitoring apparatus, according to an illustrative embodiment.
Figure 4:
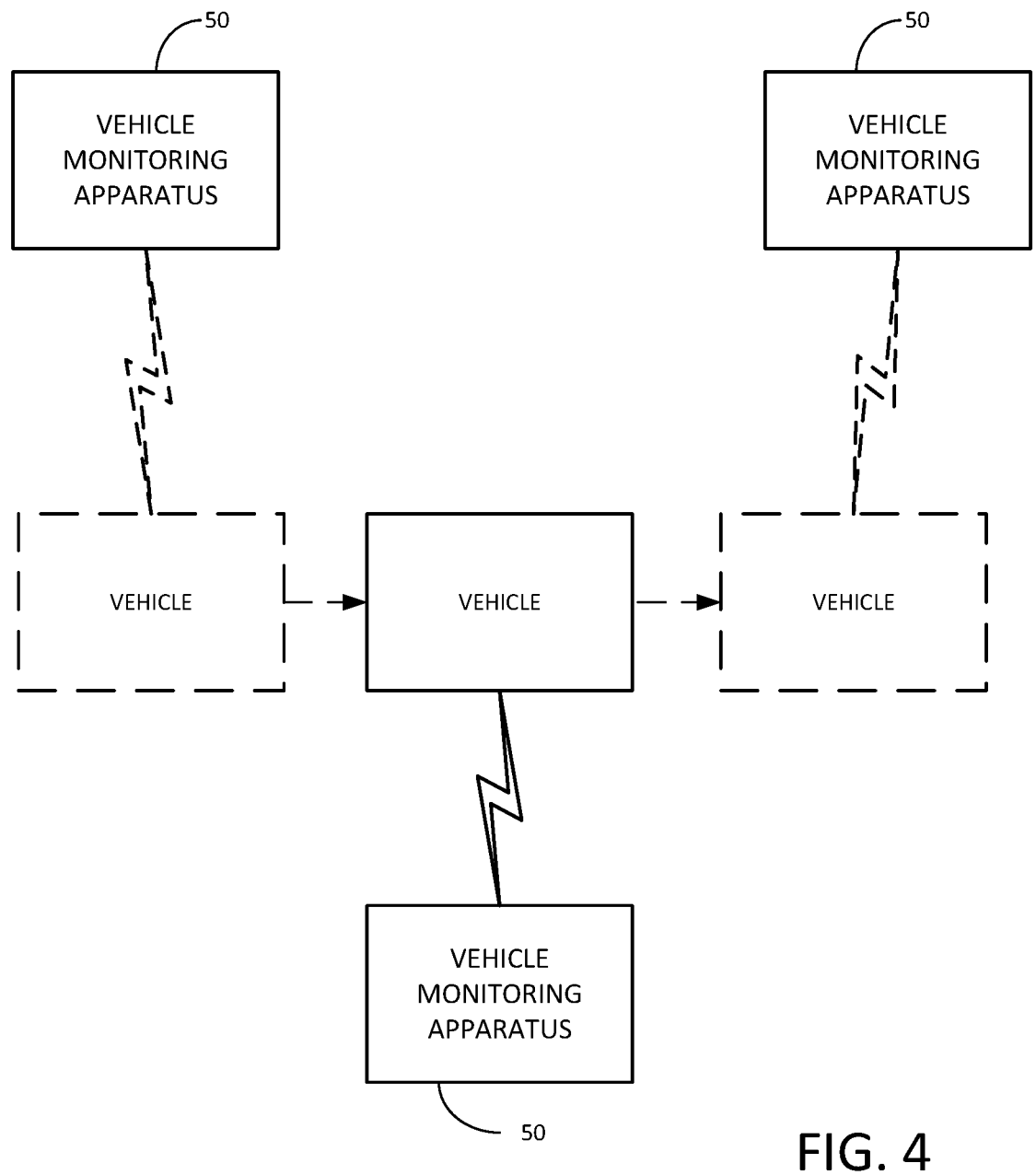
FIG. 4 is a schematic diagram of elements of the system for vehicle monitoring showing a vehicle and multiple vehicle monitoring apparatus, according to an illustrative embodiment.
Figure 5:
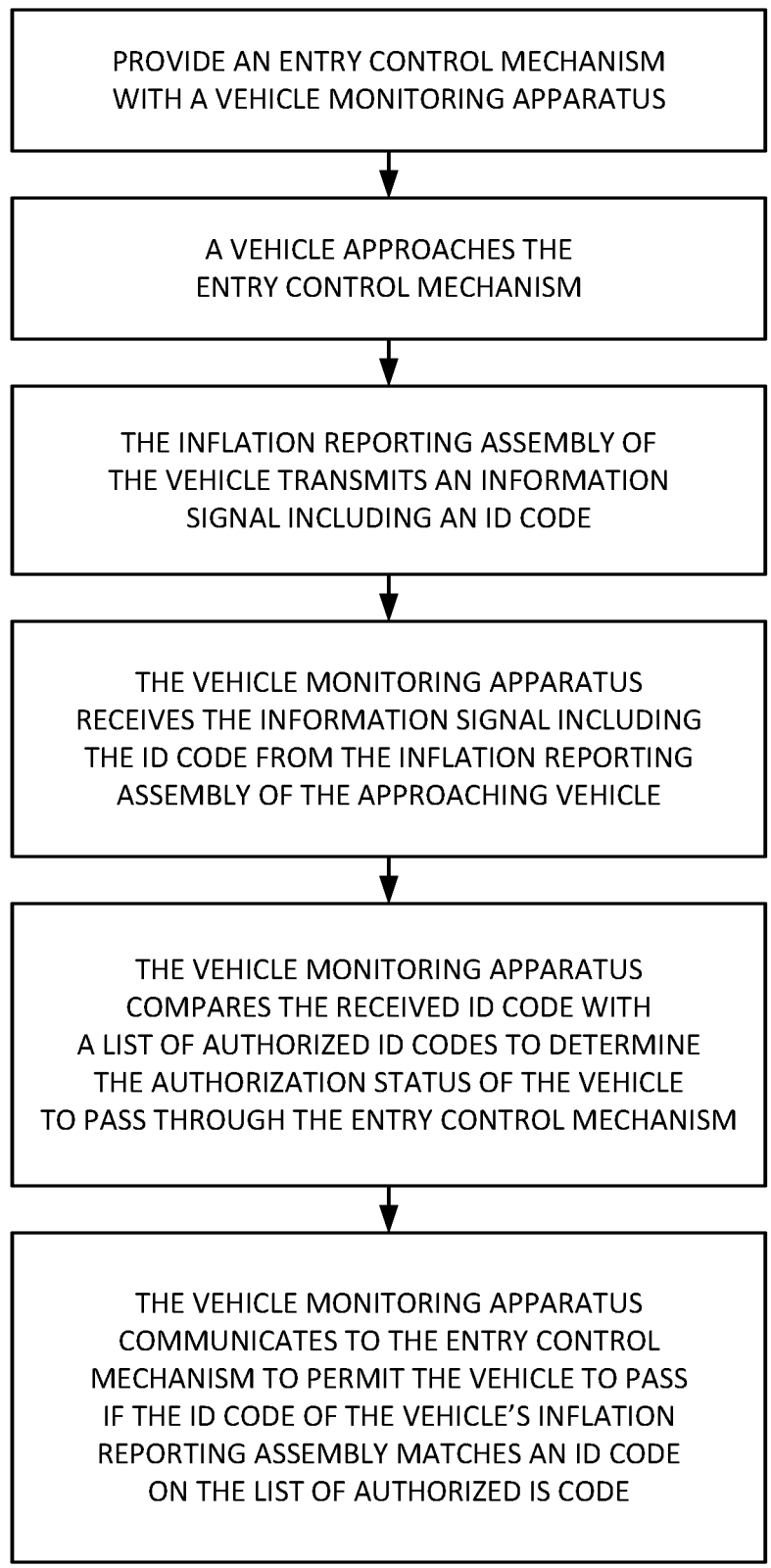
FIG. 5 is a schematic flow diagram of one implementation of aspects of the system for vehicle monitoring, according to an illustrative embodiment.

With reference now to the drawings, and in particular to FIGS. 1 through 5 thereof, a new system for vehicle monitoring utilizing tire pressure sensors embodying the principles and concepts of the disclosed subject matter will be described.

The applicant has recognized that vehicles, and in particular those vehicles of recent manufacturer, may emanate wireless signals with one or more unique identifiers which permit identification of the vehicle through the wireless transmission of information regarding the unique identifiers. For example, tire pressure monitoring systems (TPMS) have been required for most vehicles since approximately 2007, and many TPMS utilize wireless transmissions between the individual wheels of the vehicle and a central monitoring element on the vehicle. These wireless transmissions for the TPMS contain highly unique identifiers that may be used to identify the vehicle, without requiring any modification or addition to the vehicle other than the original equipment TPMS.

The applicant has developed systems and apparatus that take advantage of the unique identifiers wirelessly transmitted by the TPMS on many vehicles to identify the vehicle wirelessly, such as for monitoring the presence (or absence) of the vehicle proximate to a point or location of interest.

In one aspect, the present disclosure relates to a system 10 which may broadly include a vehicle 12, such as automobiles or trucks or even motorcycles, which includes a frame 14 and at least one wheel assembly 16, but typically include at least a pair of wheel assemblies 16, 17 and often include four wheel assemblies 16, 17, 18, and 19. The wheel assembly or assemblies may be rotatably mounted on the frame 14 of the vehicle 12 to rotate with respect to the frame.

Each of the wheel assemblies 16 may include a rim element 20 which may be mounted on an axle of the vehicle in order to be rotatable with respect to the vehicle frame 14.

An inflatable element 22 may be mounted on the rim element 20, and may at least partially define an inflation space which is configured to receive and hold a quantity of a gas, such as air. In many embodiments, the inflatable element 22 comprises a tire and defines the inflation space in combination with the rim element 20 (in, for example, a tubeless tire). Optionally, the inflatable element 22 could solely define the inflation space, such as in the case of an inner tube of a wheel assembly. Each wheel assembly 60 may include a valve element 24 which is configured to control movement of air into and out of the inflation space, and the valve element may include a valve stem in communication with the inflation space and in some embodiments may be mounted on the rim element 20.

The system 10 may also include an inflation signaling apparatus 30 associated with the vehicle 12, and more specifically associated with the one or more wheel assemblies of the vehicle, for signaling the presence and aspects of the status of the wheel assemblies of the vehicle.

The inflation signaling apparatus 30 may include at least one inflation reporting assembly 32, and may include a reporting assembly 32, 33, 34, and 35 for each wheel assembly of the vehicle 12. It should be understood that functions of the system of the disclosure require a minimum of one inflation reporting assembly 32, and the presence of additional reporting assemblies (e.g., assemblies 33, 34, and 35 associated with wheel assemblies 17, 18, 19, respectively) are not required for the essential functions of the disclosure, but the presence of additional reporting assemblies do not necessarily detract from the functionality. Moreover, with the presence of multiple inflation reporting assemblies, signals from one or more than one of the assemblies may be utilized. For the purposes of this description, one inflation reporting assembly 32 will be described with the understanding that additional inflation reporting assemblies may be present and may or may not have similar characteristics to the described reporting assembly.

The inflation reporting assembly 32 may be configured to report an inflation condition of the inflation space associated with the inflatable element 22, and the inflation condition may be reported as an information signal. The information signal may include an identification (ID) code which is associated with the particular inflation reporting assembly 32 and may be used to identify the particular wheel assembly of the vehicle for which the inflation condition is being reported. The ID code may be highly or even entirely unique to the particular inflation reporting assembly 32 in order to differentiate the reporting assembly from other reporting assemblies on the vehicle and from other reporting assemblies on other vehicles. The inflation reporting assembly 32, as well as the wheel assembly and the vehicle with which the reporting assembly is associated, may thus be uniquely identified using the ID code of the reporting assembly 32. The information signal produced by the inflation reporting assembly 32 may also include an inflation value corresponding to the inflation condition of the wheel assembly with which the particular inflation reporting assembly 32 is associated. Illustratively, the inflation value may comprise an inflation level of the associated wheel assembly, such as the air pressure in pounds per square inch or kilopascals.

In some implementations, the inflation reporting assembly 32 may be mounted on the rim element 20 of the wheel assembly 16, which is a common configuration when the assembly 32 is part of the original equipment of the vehicle from the vehicle manufacturer (OEM). In some implementations, the inflation reporting assembly 32 may be mounted on the valve element 24 of the wheel assembly 16, which is a configuration which may be used as a part of an aftermarket installation of the reporting assembly 32.

Illustratively, the inflation reporting assembly 32 may include an inflation sensor 40 which is configured to sense the inflation level in the inflation space, and the sensor 40 may generate a signal that corresponds to the sensed inflation level. The inflation reporting assembly 32 may also include processing circuitry 42 which is configured to communicate with the inflation sensor 40 to receive the inflation level sensed in the inflation space, and may be configured to receive the signal from the inflation sensor 40. In some implementations, the processing circuitry 42 may store the ID code. The reporting assembly 32 may further include a transmitter 44 which is configured to wirelessly transmit the information signal, including at least the ID code. The transmitter 44 may be configured to receive the ID code from the processing circuitry, or optionally may be programmed with the ID code. The information signal may further include the inflation condition of the inflation space associated with the reporting assembly 32, such as the inflation level. It will be recognized that the elements of the inflation reporting assembly 32 may be physically integrated together, and may be distinguished only functionally.

The system 10 may also include at least one vehicle monitoring apparatus 50 which is configured to monitor a characteristic of the vehicle 12 based upon communication with the inflation signaling apparatus 30 associated with the vehicle. In some implementations of the disclosure, the vehicle monitoring apparatus 50 may be configured to sense a presence of the inflation reporting assembly 32 when proximate to the vehicle monitoring apparatus 50, and by extension sense the presence of the vehicle 12 associated with the inflation reporting assembly 32. Typically, the vehicle monitoring apparatus 50 is separate of the vehicle 12, such as in a physical sense, and the vehicle monitoring apparatus does not move from geographic location to location along with the vehicle. In some of the most preferred embodiments of the disclosure, the position of the vehicle monitoring apparatus may be stationary in a geographic sense, and may be associated with a physical structure such as, for example, a parking facility or structure like a parking lot or a parking ramp (and, in some case, the entry control mechanisms used to control entry and utilization of the parking structures). Proximity of the vehicle monitoring apparatus 50 to the inflation signaling apparatus 30 for successful wireless transmission and collection of ID code information may vary, but may, as an example, be approximately 100 feet or less. In some implementations, the range of vehicle monitoring apparatus 50 may have an effective detection range that is significantly more limited, such as approximately 50 feet or less, approximately 30 feet or less, or even 10 feet or less, depending upon the degree of precision of location monitoring is desired.

In some embodiments, the vehicle monitoring apparatus 50 may include at least one receiver 52 which is configured to wirelessly receive the information signal transmitted from the inflation reporting apparatus 32 when the apparatus 32 is within wireless transmission/reception range of the monitoring apparatus 50. Significantly, the receiver 52 is configured to receive the ID code of the information signal transmitted by the inflation reporting assembly. Optionally, the apparatus 50 may include a triggering transmitter 54 which may transmit a triggering transmission, or "ping," to proximate inflation reporting assemblies 32 to cause one or more of the assemblies 32 to respond by transmitting a signal which may include the ID code of the assembly. The triggering transmitter may be separate or integrated with the receiver 52 of the apparatus 50. The vehicle monitoring apparatus 50 may also include a processor 58 which is configured to receive information from the receiver 52, such as an ID code received by the receiver. The processor 58 may be configured to store the ID code received by the receiver 52 and a location of the vehicle monitoring apparatus at substantially the same time that the ID code was received from the inflation reporting assembly to create one or more records containing ID codes detected by the vehicle monitoring apparatus and corresponding timestamps for those instances of ID code detections. Optionally, the processor 58 may be configured to ignore or discard information in the information signal not related to the ID code, such as, for example, the inflation level.

In some utilizations, the vehicle monitoring apparatus 50 may have a stationary installation in which the apparatus does not move when detecting the presence of vehicles. As an example, the vehicle monitoring apparatus may be associated with a point of entry through a barrier, such as a gate in a fence or wall, to detect and identify and determine the authorization of the vehicle to move through the point of entry through the barrier. Such utilizations may be useful in controlling access to secure facilities, parking lots and ramps, or other suitable utilizations where controlled access by vehicles is desired. Optionally, the vehicle monitoring apparatus 50 may be located adjacent to a parking stall or space of a parking facility so that the apparatus 50 is able to detect the ID code of at least one inflation signaling apparatus associated with a vehicle in the parking space to identify and determine the authorization of the vehicle to be located in the parking space.

For example, a listing of authorized ID codes associated with inflation signaling apparatus associated with authorized vehicles may be established and maintained, such that a comparison may be made between an ID code emanating from an inflation signaling apparatus of an approaching vehicle with authorized ID codes in the listing of authorized ID codes, and a match between the received ID code and one of the authorized ID codes may be required in order for the vehicle to be allowed through the controlled point of entry. As a further example, the vehicle monitoring apparatus 50 may be utilized to detect and record ID codes associated with vehicles moving through or past a point for potential future reference, without necessarily checking the ID code against a list of ID codes. Optionally, the exit of vehicles from a controlled space (e.g., parking lot) may be monitored in addition to the entry of vehicles into the controlled space.

As a further option, the vehicle monitoring apparatus 50 may be configured to receive information signals from more than one inflation signaling apparatus associated with a vehicle (see, e.g., FIG. 1) to receive and collect more than one ID code associated with the signaling apparatus of a vehicle for an enhanced degree of identification, particularly if a match of more than one ID code associated with a vehicle is required for authorization to, for example, pass through a controlled point of entry.

In some implementations, a plurality of the vehicle monitoring apparatus 50 may be utilized in the system 1 (see, e.g., FIG. 4), and the monitoring apparatus may be geographically spaced or separated from each other to provide detection of movement of the vehicle 12 to some or all of the locations associated with the individual monitoring apparatus. Further, the plurality of vehicle monitoring apparatus may be communicatively linked, such as through a data communication network, to provide coordinated information regarding movement of the vehicle.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
    a vehicle with an inflation signaling apparatus having at least one inflation reporting assembly, the at least one inflation reporting assembly being configured to wirelessly transmit an information signal including an identification (ID) code uniquely associated with the at least one inflation reporting assembly to differentiate the inflation reporting assembly from other inflation reporting assemblies and differentiate the vehicle from other vehicles in proximity to the vehicle; and
    at least one vehicle monitoring apparatus configured to monitor a characteristic of the vehicle based upon the inflation signaling apparatus associated with the vehicle, the at least one vehicle monitoring apparatus being physically separate of the vehicle such that a location of the vehicle is movable independent of the vehicle monitoring apparatus and a location the vehicle monitoring apparatus does not move from geographic location to geographic location when the location of the vehicle is moved, the at least one vehicle monitoring apparatus being configured to sense a presence of the inflation reporting assembly proximate to the vehicle monitoring apparatus via reception by the monitoring apparatus of a transmission of the ID code by the inflation signaling apparatus associated with the vehicle.

2. The system of claim 1 wherein the at least one inflation reporting assembly of the inflation signaling apparatus is associated with a wheel assembly of the vehicle.

3. The system of claim 1 wherein the at least one inflation reporting assembly of the inflation signaling apparatus comprises a plurality of inflation reporting assemblies, each of the inflation reporting assemblies being associated with one wheel assembly of a plurality of wheel assemblies of the vehicle.

4. The system of claim 1 wherein the at least one inflation reporting assembly of the inflation signaling apparatus is configured to report an inflation condition of an inflation space of a wheel assembly of the vehicle with which the inflation reporting assembly is associated, the at least one inflation reporting assembly being configured to transmit the information signal with the ID code and an inflation value corresponding to the inflation condition of the wheel assembly with which the at least one inflation reporting assembly is associated.

5. The system of claim 1 wherein the at least one inflation reporting assembly comprises:
  an inflation sensor configured to sense an inflation level in an inflation space of a wheel assembly of the vehicle with which the at least one inflation reporting assembly is associated; and
  a transmitter configured to wirelessly transmit the information signal including the ID code and an indication of the inflation level of the inflation space.

6. The system of claim 1 wherein the vehicle monitoring apparatus further comprises:
  at least one receiver configured to wirelessly receive the information signal transmitted from the inflation reporting apparatus associated with the vehicle with the ID code associated with the at least one inflation reporting assembly.

7. The system of claim 6 wherein the vehicle monitoring apparatus further comprises:
  a processor configured to receive information from the receiver including the ID code received by the receiver, the processor being configured to store the ID code and a location of the vehicle monitoring apparatus at substantially the same time that the ID code was received.

8. The system of claim 7 wherein the processor of the vehicle monitoring apparatus is configured to compare a said ID code received by the receiver with a plurality of authorized ID codes to detect a match between the received ID code and one of the ID codes in the listing of authorized ID codes.

9. The system of claim 7 wherein the at least one receiver of the vehicle monitoring apparatus is configured to receive a plurality of information signals from a plurality of inflation reporting assemblies from a plurality of vehicles with respective ID codes.

10. The system of claim 1 wherein the vehicle monitoring apparatus is associated with an entry control mechanism positioned at a point of entry of a parking facility for authorizing passage of the vehicle through the point of entry of the parking facility.

11. A system comprising:
  a vehicle with an inflation signaling apparatus having at least one wheel assembly with an inflation reporting assembly, the inflation reporting assembly including a transmitter configured to wirelessly transmit an information signal including an identification (ID) code uniquely associated with the inflation reporting assembly to differentiate the inflation reporting assembly from other inflation reporting assemblies and differentiate the vehicle from other vehicles in proximity to the vehicle; and
  at least one vehicle monitoring apparatus including a receiver configured to receive a said information signal from a said inflation reporting assembly, the at least one vehicle monitoring apparatus being physically separate of the vehicle such that a location of the vehicle is movable independent of the vehicle monitoring apparatus and a location the vehicle monitoring apparatus does not move from geographic location to geographic location when the location of the vehicle is moved, the at least one vehicle monitoring apparatus being configured to sense a presence of the inflation reporting assembly proximate to the vehicle monitoring apparatus via reception by the monitoring apparatus of a transmission of the ID code by the inflation signaling apparatus associated with the vehicle.

12. The system of claim 11 wherein the vehicle has a plurality of wheel assemblies, a said inflation reporting assembly being associated with each of the wheel assemblies.

13. The system of claim 11 wherein the inflation reporting assembly of the inflation signaling apparatus is configured to detect and report an inflation condition of an inflation space of the at least one wheel assembly of the vehicle, the transmitter of the at least one inflation reporting assembly being configured to transmit the information signal with the ID code and an inflation value corresponding to the inflation condition of the at least one wheel assembly with which the inflation reporting assembly is associated.

14. The system of claim 11 wherein the vehicle monitoring apparatus further comprises a processor configured to receive information from the receiver including the ID code received by the receiver, the processor being configured to configured to compare a said ID code received by the receiver with a plurality of authorized ID codes to detect a match between the received ID code and one of the ID codes in the listing of authorized ID codes.

15. The system of claim 14 wherein the processor of the vehicle monitoring apparatus is further configured to store the ID code and a location of the vehicle monitoring apparatus at substantially the same time that the ID code was received.

16. The system of claim 11 wherein the vehicle monitoring apparatus is associated with an entry control mechanism positioned at a point of entry of a parking facility for authorizing passage of the vehicle through the point of entry of the parking facility.

17. The system of claim 1 wherein the location of the at least one vehicle monitoring apparatus is stationary in a geographic sense, and the location of the vehicle with the inflation signaling apparatus is movable in a geographic sense.

18. The system of claim 1 wherein the at least one vehicle monitoring apparatus is associated with a parking facility and an entry control mechanism used to control entry and utilization of the parking facility.

19. The system of claim 11 wherein the location of the at least one vehicle monitoring apparatus is stationary in a geographic sense, and the location of the vehicle with the inflation signaling apparatus is movable in a geographic sense.

20. The system of claim 11 wherein the at least one vehicle monitoring apparatus is associated with a parking facility and an entry control mechanism used to control entry and utilization of the parking facility.

* * * * *